United States Patent
Iino et al.

(10) Patent No.: US 12,427,821 B2
(45) Date of Patent: Sep. 30, 2025

(54) TORSION BAR UNIT

(71) Applicant: NHK SPRING CO., LTD., Yokohama (JP)

(72) Inventors: Shinji Iino, Yokohama (JP); Saiji Uetsuhara, Yokohama (JP); Takuya Sato, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 18/826,700

(22) Filed: Sep. 6, 2024

(65) Prior Publication Data
US 2024/0424850 A1    Dec. 26, 2024

Related U.S. Application Data

(63) Continuation of application No. PCT/JP2023/007364, filed on Feb. 28, 2023.

(30) Foreign Application Priority Data

Mar. 31, 2022 (JP) ................................. 2022-060729

(51) Int. Cl.
*B60G 11/20* (2006.01)
(52) U.S. Cl.
CPC ...... *B60G 11/20* (2013.01); *B60G 2204/1224* (2013.01); *B60G 2206/427* (2013.01);
(Continued)
(58) Field of Classification Search
CPC ....... B60G 11/18; B60G 11/189; B60G 11/20; B60G 2202/13; B60G 2202/135;
(Continued)

(56) References Cited

U.S. PATENT DOCUMENTS 2,723,870 A * 11/1955 Page .................. B60G 9/00
                                                             280/124.169
3,175,842 A * 3/1965 Rogers ................. B60G 21/055
                                                             267/273
(Continued)

FOREIGN PATENT DOCUMENTS

DE    102014223635 A1    5/2016
EP        1298347 A2    4/2003
(Continued)

OTHER PUBLICATIONS

ISA/JP, Written Opinion, May 23, 2023 re PCT International Patent application No. PCT/JP2023/007364 with English translation.
(Continued)

*Primary Examiner* — Laura Freedman
(74) *Attorney, Agent, or Firm* — PERRY + CURRIER INC.

(57) ABSTRACT

A torsion bar unit includes a cylindrical shaped torsion bar including a fiber-reinforced composite material and extending in a first direction, a first holding member having a first groove for holding an end part of the torsion bar, and a second holding member having a second groove for holding the end part of the torsion bar at a position opposite the first groove and sandwiching and holding the end part of the torsion bar between the first groove and the second groove by overlapping the first holding member and the second holding member.

16 Claims, 15 Drawing Sheets

(52) U.S. Cl.
CPC .............. *B60G 2206/7101* (2013.01); *B60G 2206/8201* (2013.01); *B60G 2206/821* (2013.01)

(58) Field of Classification Search
CPC ...... B60G 2202/1351; B60G 2204/122; B60G 2204/1224; B60G 2204/4307; B60G 2206/427; B60G 2206/7101; B60G 21/055; B60G 21/0551; F16F 1/16; F16F 1/366
See application file for complete search history.

(56) References Cited

U.S. PATENT DOCUMENTS

| | | | | |
|---|---|---|---|---|
| 3,939,779 | A * | 2/1976 | Pringle | F16D 55/32 |
| | | | | 105/182.1 |
| 4,131,491 | A * | 12/1978 | Joseph | C21D 1/06 |
| | | | | 267/273 |
| 4,243,247 | A * | 1/1981 | Kataoka | B60G 17/025 |
| | | | | 267/284 |
| 4,540,197 | A * | 9/1985 | Finn | F16F 1/26 |
| | | | | 280/124.167 |
| 5,013,166 | A * | 5/1991 | Domer | B60G 21/0551 |
| | | | | 384/220 |
| 5,478,103 | A * | 12/1995 | Maeda | B60G 7/001 |
| | | | | 280/124.152 |
| 6,099,006 | A * | 8/2000 | Sugiyama | B60G 17/025 |
| | | | | 280/124.152 |
| 6,454,284 | B1 * | 9/2002 | Worman, Jr. | B60G 17/0277 |
| | | | | 280/124.167 |
| 7,065,875 | B2 * | 6/2006 | Cai | F16F 1/3835 |
| | | | | 219/156 |
| 7,380,775 | B2 * | 6/2008 | Niwa | B29C 66/1122 |
| | | | | 267/293 |
| 7,494,143 | B2 * | 2/2009 | Verbowski | F16F 1/16 |
| | | | | 280/124.167 |
| 8,186,697 | B2 * | 5/2012 | Stephenson | B60G 3/145 |
| | | | | 280/124.129 |
| 8,191,911 | B1 * | 6/2012 | Reynolds | B60G 3/20 |
| | | | | 280/124.13 |
| 8,454,774 | B2 * | 6/2013 | Grundmeier | B29C 65/48 |
| | | | | 280/107 |
| 9,180,918 | B2 * | 11/2015 | Oh | B62D 33/067 |
| 12,128,728 | B1 * | 10/2024 | Les | B60G 11/185 |

FOREIGN PATENT DOCUMENTS

| | | | | |
|---|---|---|---|---|
| JP | S39021707 | Y1 | | 7/1964 |
| JP | S56124506 | U | | 9/1981 |
| JP | S58104439 | U | | 7/1983 |
| JP | S58104440 | U | | 7/1983 |
| JP | S6117731 | A | | 1/1986 |
| JP | 01278815 | A | * | 11/1989 |
| JP | 02117409 | A | * | 5/1990 |
| JP | H02098230 | U | | 8/1990 |
| JP | 06064424 | A | * | 3/1994 |
| JP | H09226334 | A | * | 9/1997 |
| JP | 2001163026 | A | * | 6/2001 ......... B60G 21/0551 |
| JP | 2006007887 | A | * | 1/2006 |
| JP | 2011189780 | A | * | 9/2011 |
| JP | 2014201147 | A | | 10/2014 |
| KR | 19980049125 | A | * | 9/1998 |

OTHER PUBLICATIONS

JPO, Office Action dated Feb. 4, 2025, issued in JP Appl. No. 2022-060729 with English translation.
International Search Report, mailed May 23, 2023, issued in corresponding PCT application No. PCT/JP2023/007364, filed Mar. 31, 2022, with English translation of the ISR.
EESR dated Jun. 26, 2025, issued in EP Appl. No. 23779147.0. [EP-EESR].

* cited by examiner

TORSION BAR UNIT

CROSS-REFERENCE TO RELATED APPLICATIONS

This application is a Continuation of International Patent Application No. PCT/JP2023/7364, filed on Feb. 28, 2023, which claims the benefit of priority to Japanese Patent Application No. 2022-060729, filed on Mar. 31, 2022, the entire contents of which are incorporated herein by reference.

FIELD

An embodiment of the present invention relates to a torsion bar unit.

BACKGROUND

Conventionally, a torsion bar suspension is used as a vehicle suspension. The torsion bar suspension includes an arm mechanism that supports a wheel and is rotatably connected to a vehicle body, and a torsion bar spring (hereinafter, abbreviated to a torsion bar) that is connected between the arm mechanism and the vehicle body and twists and deforms in response to a swing of the arm mechanism.

In the case where the torsion bar is connected to the arm mechanism, at an end part of the torsion bar, a serration formed by cutting or the like is fitted into a hole formed in a torque arm, which is a part of the arm mechanism, to fix the rotational direction.

In addition, although a torsion bar made of steel has a disadvantage of being long and heavy, it is desired to reduce the weight of the torsion bar by using a fiber-reinforced synthetic resin (hereinafter, also referred to as FRP) (see Japanese laid-open utility model application publication No. S58-104439 and Japanese laid-open utility model application publication No. S58-104440).

SUMMARY

A torsion bar unit according to an embodiment of the present invention includes a cylindrical shaped torsion bar including a fiber-reinforced composite material extending in a first direction, a first holding member having a first groove for holding an end part of the torsion bar, and a second holding member having a second groove for holding the end part of the torsion bar at a position opposite the first groove and sandwiching and holding the end part of the torsion bar between the first groove and the second groove by overlapping the first holding member and the second holding member.

The torsion bar unit further includes a core rod inserted into a cylindrical shaped hollow at the end part, in the above configuration.

A corner of a tip of the core rod is rounded or tapered in a direction of insertion of the core rod into the cylindrical shaped hollow, in the above configuration.

A shape of an end part of the torsion bar is a cylindrical polygon shape, in the above configuration.

The cylindrical polygon shape is a square, hexagonal, or cylindrical octagon shape, in the above configuration.

The second holding member has a through hole in a vicinity of the second groove, the first holding member has a bolt hole in a position opposite the through hole, and the first holding member is secured to the second holding member by a bolt inserted into the through hole of the second holding member, in the above configuration.

The second holding member has an inlay convex portion projecting from a surface opposite the first holding member in a vicinity of the second groove and a through hole passing through the inlay convex portion, and the first holding member has an inlay recess portion engaging with the inlay convex portion and a bolt hole formed on a bottom surface of the inlay recess portion and located at a position corresponding to the through hole, in the above configuration.

The second holding member has an inlay recess portion provided on a surface opposite the first holding member in a vicinity of the second groove and a through hole passing through the inlay recess portion, and the first holding member has an inlay convex portion engaging with the inlay recess portion and a bolt hole provided in the inlay convex portion at a position corresponding to the through hole, in the above configuration.

The first holding member is fixed to the second holding member by an adhesive material, in the above configuration.

The first groove extends along the first direction, a third groove is provided in the first groove, the second groove extends along the first direction, and a fourth groove is provided in the second groove, in the above configuration.

The first and second holding members are fixed by welding, in the above configuration.

A thickness of an end part is thicker than a thickness of the portion of the torsion bar other than the end part, in the above configuration.

A first holding member is integrally formed with a suspension arm, anchor arm, or torque arm, in the above configuration.

According to an embodiment of the present invention, it is possible to securely fix a torsion bar without processing an FRP at an end part of the torsion bar using the FRP.

DESCRIPTION OF EMBODIMENTS

Figure 1:
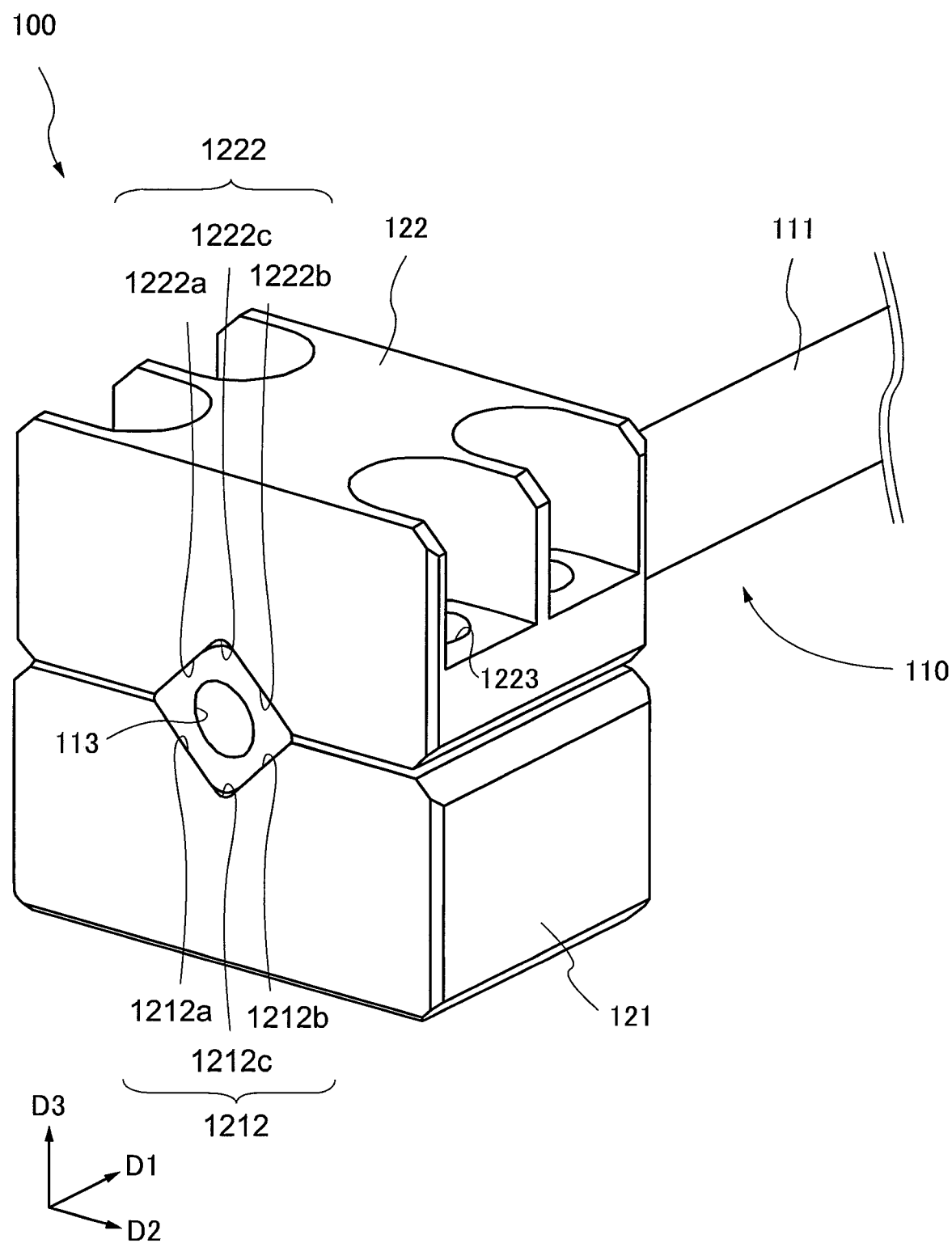
FIG. 1 is a schematic diagram of a torsion bar unit according to an embodiment of the present invention.

It is difficult to form a serration at an end part of a torsion bar using an FRP due to the difficulty in processing due to the presence of fibers and the fear of a decrease in strength due to the cutting of fibers. In addition, due to variations in the material itself, it is difficult to obtain a shape precision that can be press-fitted using the FRP. Therefore, in the case where the torsion bar using the FRP is formed, a torque arm needs to be processed individually to fit the shape of the end part.

An object of an embodiment of the present invention is to securely fix the torsion bar without processing the FRP at the end part of the torsion bar using the FRP.

Hereinafter, embodiments of the present invention will be described with reference to the drawings. However, the present invention can be implemented in various forms without departing from the gist thereof, and should not be construed as being limited to the description of the following exemplary embodiments.

In the drawings, the widths, thicknesses, shapes, and the like of the respective portions may be schematically represented in comparison with the actual embodiments for clarity of explanation, but the drawings are merely examples, and do not limit the interpretation of the present invention. Furthermore, in the embodiments of the present invention, elements having the same functions as those described with respect to the above-described drawings are denoted by the same reference signs, and redundant descriptions thereof may be omitted.

In the present specification and the like, when a plurality of the same or similar configurations is collectively represented, the same reference signs or the same reference signs added with capital letters may be represented. In describing a plurality of parts of one configuration separately, the same reference signs may be used, and hyphens and natural numbers may be further used.

In this specification and the like, terms such as "first", "second", and "third" added to each configuration are convenient labels used to distinguish each configuration, and do not have any further meaning unless otherwise described.

First Embodiment

In the present embodiment, a torsion bar unit 100 according to an embodiment of the present invention will be described with reference to FIG. 1 to FIG. 12.

Figure 2A:
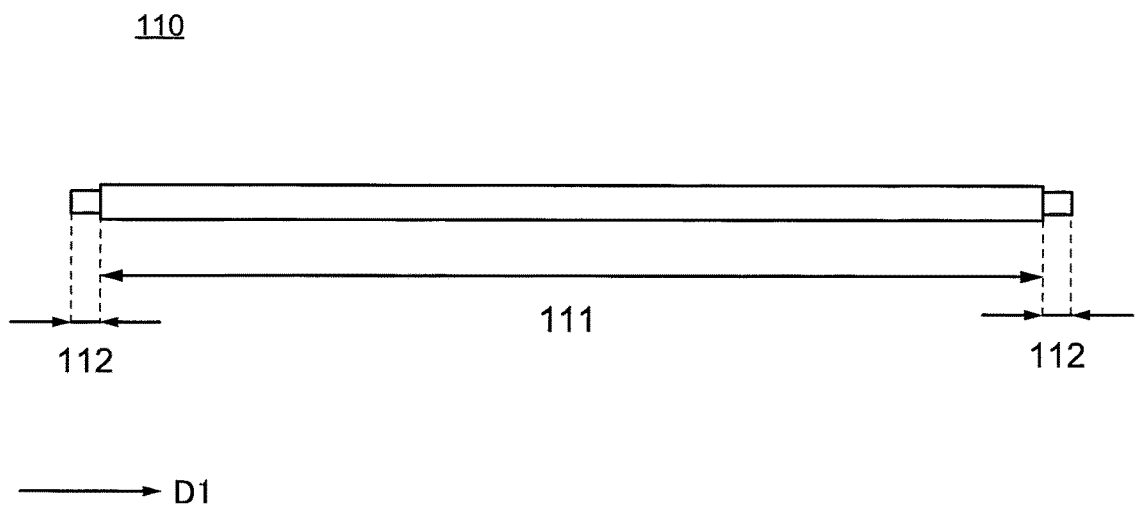
FIG. 2A is an overall view of a torsion bar.
Figure 2B:
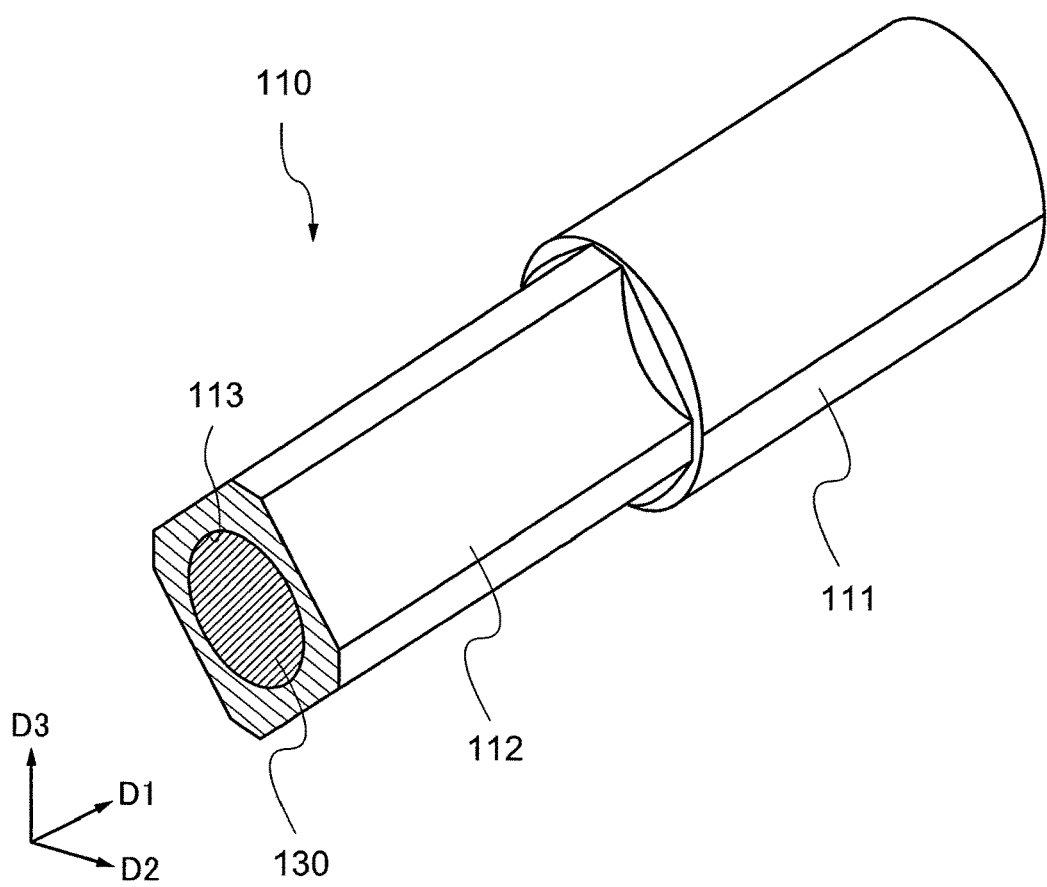
FIG. 2B is an enlarged view of an end part of a torsion bar.

FIG. 1 is a schematic diagram of the torsion bar unit 100 according to an embodiment of the present invention. FIG. 2A is an overall view of a torsion bar 110 and FIG. 2B is an enlarged view of an end part 112 of the torsion bar 110. The torsion bar unit 100 includes the torsion bar 110 and a holding member 121 and a holding member 122 that hold the torsion bar 110. The torsion bar unit 100 develops a spring mechanism by fixing one of the end parts 112 of the torsion bar 110 with the holding members 121 and 122 and attaching the other of the end part 112 to a torque arm or the like.

As shown in FIG. 2A, the torsion bar 110 includes a fiber-reinforced composite material and has a cylindrical shape extending in a first direction. For example, a fiber-reinforced plastic such as a carbon fiber-reinforced plastic, a glass fiber-reinforced plastic, or an aramid fiber-reinforced plastic is used as the fiber-reinforced composite material. Naturally occurring fibers such as CNF (cellular nanofiber), basalt fiber, or flux fiber may be used as the fiber. Examples of a matrix resin of the fiber-reinforced composite material include epoxy, polyurethane, and unsaturated polyester. A compressive strength of epoxy is 103 MPa to 173 MPa, a compressive strength of polyurethane is 138 MPa, and unsaturated polyester is 89 MPa to 207 MPa.

The torsion bar 110 includes a body 111 and the end part 112. In this case, the body 111 of the torsion bar 110 refers to parts other than the end part 112. As shown in FIG. 2B, the cylindrical shape of the end part 112 in the torsion bar 110 is different from the cylindrical shape of the body 111. The body 111 has a cylindrical shape, while the end part 112 has a cylindrical polygon shape. In the torsion bar 110, a cylindrical space (also referred to as a hollow 113) is arranged between the body 111 and the end part 112. That is, an inner diameter of the cylindrical polygon shape (a diameter of a cylinder) of the end part 112 is substantially the same as an inner diameter of the cylindrical shape (a diameter of a cylinder) of the body 111. In this specification and the like, a direction in which the torsion bar 110 extends is referred to as a first direction D1. For example, the torsion bar 110 is formed by a sheet winding method or a filament winding method. The torsion bar 110 is formed into a cylindrical polygon shape by winding a sheet or filament-like material around a core rod for forming and compressing only the end part 112 with a mold or the like. Since the end part 112 is compressed by a mold or the like, it becomes thinner than the thickness of the body 111.

The end part 112 of the torsion bar 110 is a part sandwiched and held by the holding member 121 and the holding member 122. Therefore, the end part 112 of the torsion bar 110 preferably has a higher compressive strength. Since the above-described material is a material having high compressive strength, it is suitable as the matrix resin of the fiber-reinforced composite material.

In order to increase the compressive strength of the end part 112, a core rod 130 may be arranged in the cylindrical hollow 113 at the end part 112 of the torsion bar 110. Examples of materials of the core rod 130 include metals such as iron, steel, and aluminum, alloys, and hard resins. A compressive strength of the core rod 130 is preferably higher than a compressive strength of the matrix resin. A material higher than the compressive strength of the matrix resin may be appropriately selected as the material of the core rod. Although the core rod 130 is illustrated as a solid material in FIG. 2B, an embodiment of the present invention is not limited to this, and the core rod 130 may be a hollow material.

Figure 3A:
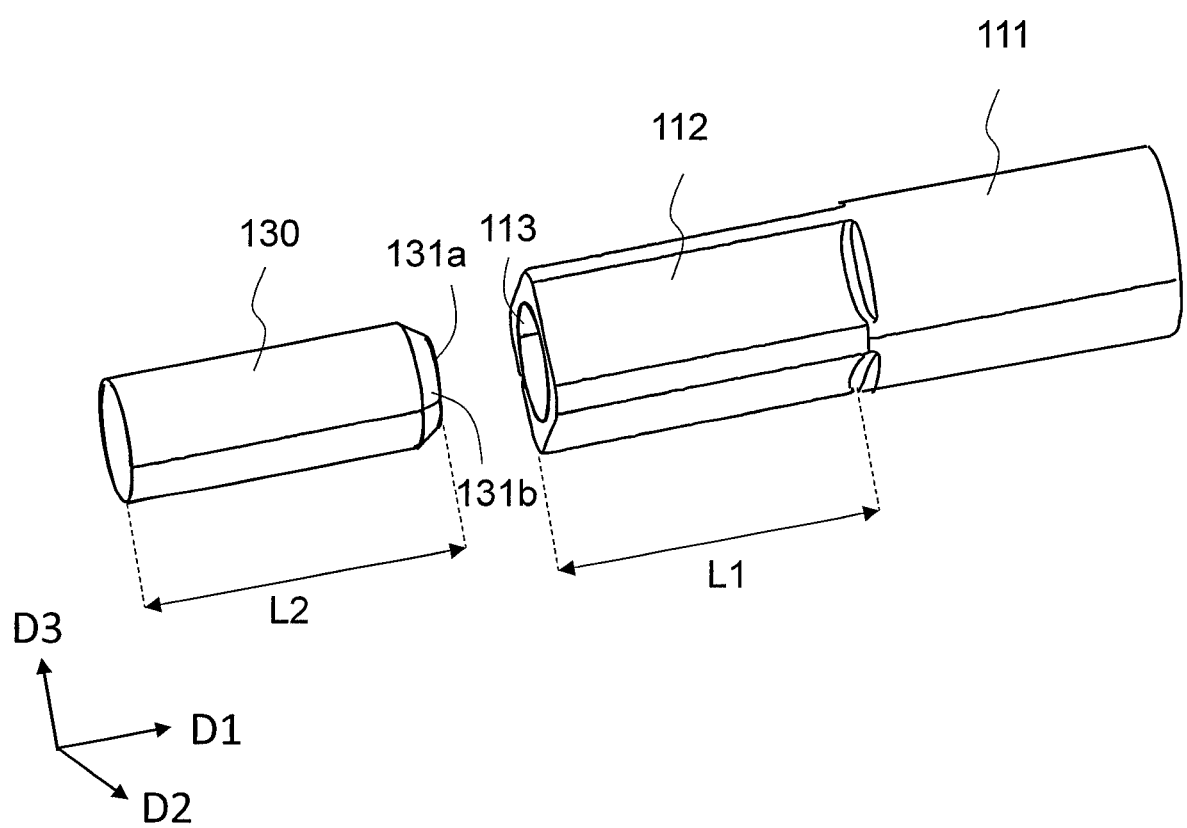
FIG. 3A is an enlarged view of an end part of a torsion bar.
Figure 3B:
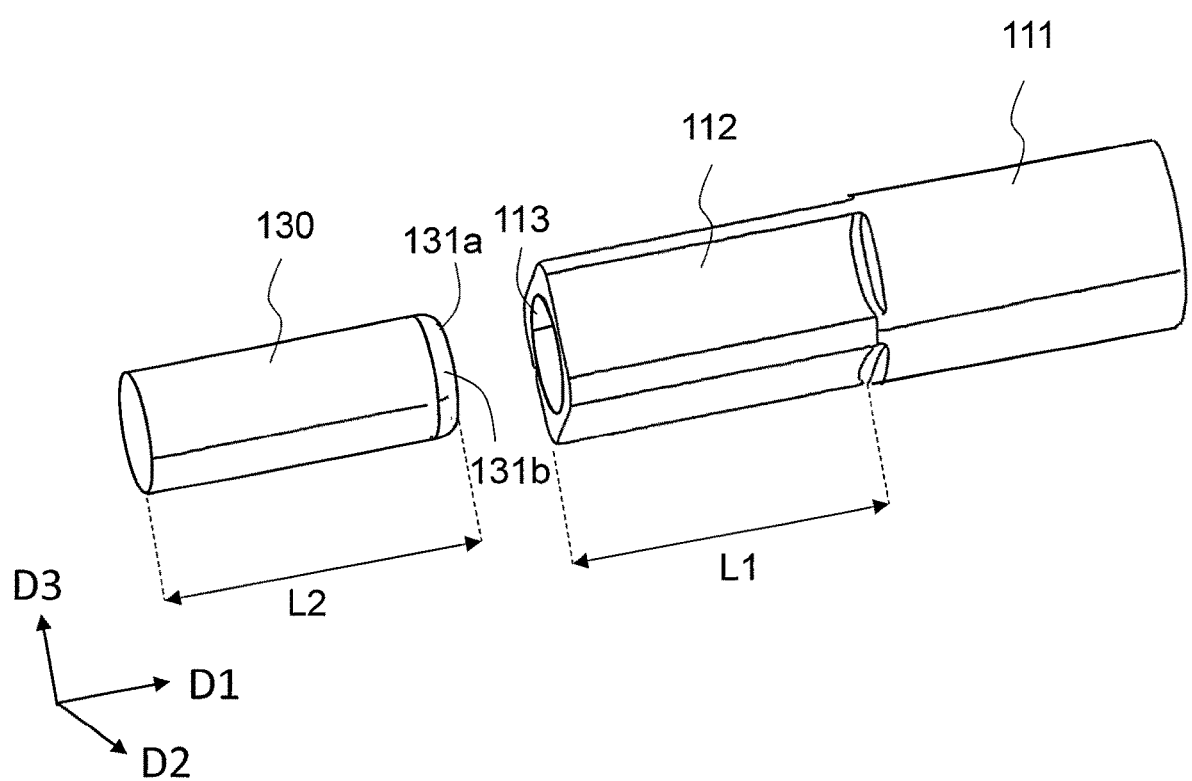
FIG. 3B is an enlarged view of an end part of a torsion bar.

FIG. 3A and FIG. 3B are enlarged views of the end part 112 of the torsion bar 110. In a direction (the first direction D1) in which the core rod 130 is inserted into the cylindrical hollow 113, a corner 131b of a tip 131a of the core rod 130 may be chamfered. The chamfering is preferably an R chamfering or a C chamfering. The C chamfering is a method of chamfering a pin angle into a plane at an angle of 45 degrees. The R chamfering is a method of chamfering a corner to be rounded. As shown in FIG. 3A, the corner 131b at the tip 131a of the core rod 130 is preferably a tapered shape (C chamfering). Alternatively, as shown in FIG. 3B, the corner 131b at the tip 131a of the core rod 130 is preferably a rounded shape (R-chamfering). Since the corner 131b at the tip 131a of the core rod 130 is a tapered shape or a rounded shape, when inserting the core rod 130 into the hollow 113, it becomes easier to insert the core rod 130 into the hollow 113. Alternatively, when inserting the core rod 130 into the hollow 113, it is possible to suppress the hollow 113 of the torsion bar 110 from being damaged.

The shape of the end part 112 of the torsion bar 110 is a cylindrical polygon shape. In other words, a cross-sectional shape at the end part 112 along the second direction D2 perpendicular to the first direction D1 along which the torsion bar 110 extends is polygonal. Each cylindrical polygon corner may be chamfered. The chamfering is preferably the R chamfering or the C chamfering. Although the case where the shape of the end part 112 is a cylindrical quadrangular shape and each corner of the cylindrical quadrangular shape is chamfered will be described in the present embodiment, an embodiment of the present invention is not limited to this. For example, the shape of the end part 112 may be a cylindrical triangular shape, a cylindrical pentagon shape, a cylindrical hexagon shape, a cylindrical heptagon shape, or a cylindrical octagon shape, or the like. In view of the ease of forming the end part 112 of the torsion bar 110, the shape of the torsion bar 110 is preferably a cylindrical square shape, a cylindrical hexagon shape, or a cylindrical octagon shape. In addition, each cylindrical polygon corner may not be chamfered along the first direction D1.

The case where the end part 112 of the torsion bar 110 is thinner than the body 111 will be described in the present embodiment. In this case, the thickness of the end part 112 refers to a diameter of an inscribed circle having a cross-sectional shape at the end part 112. In addition, the thickness of the body 111 refers to a diameter of a circle because the cross-sectional shape of the body 111 is circular.

Next, a length of the core rod 130 to be inserted into the end part 112 of the torsion bar 110 will be described with reference to FIG. 4A and FIG. 4B.

Figure 4A:
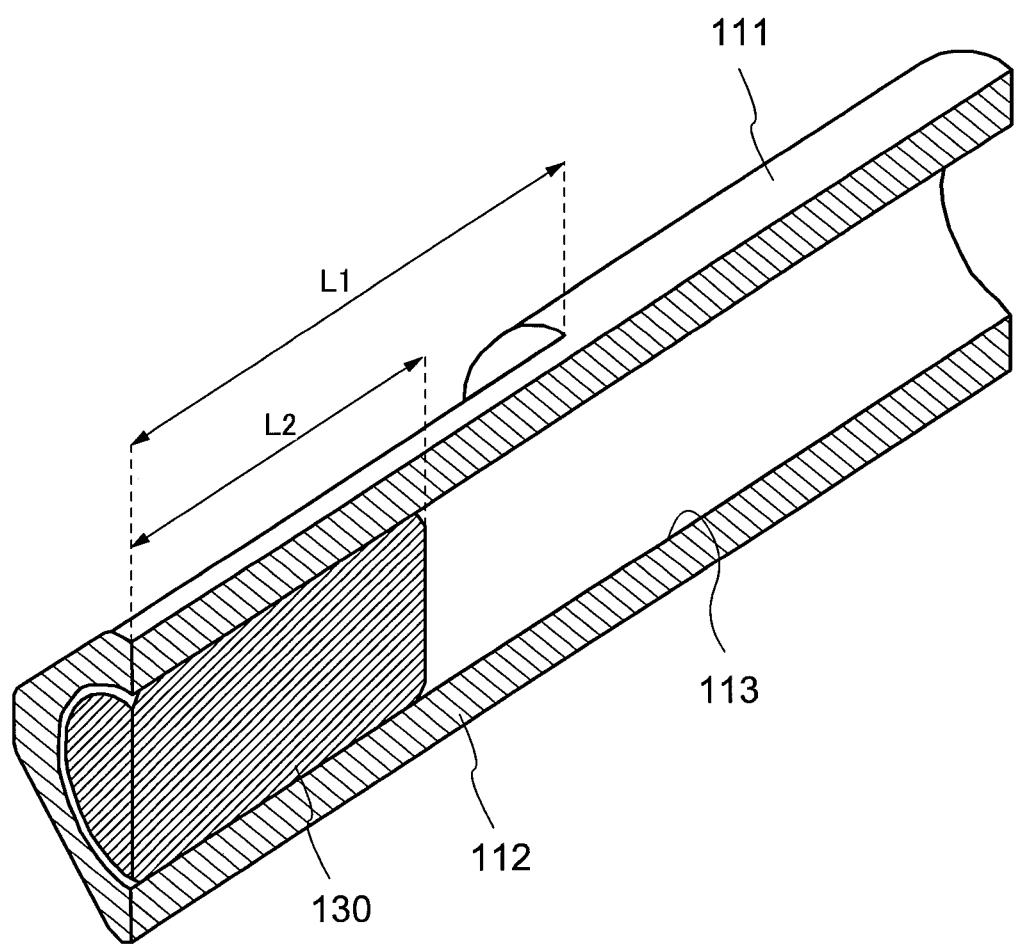
FIG. 4A is an enlarged view of an end part of a torsion bar.
Figure 4A:
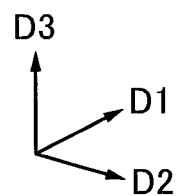
Figure 4B:
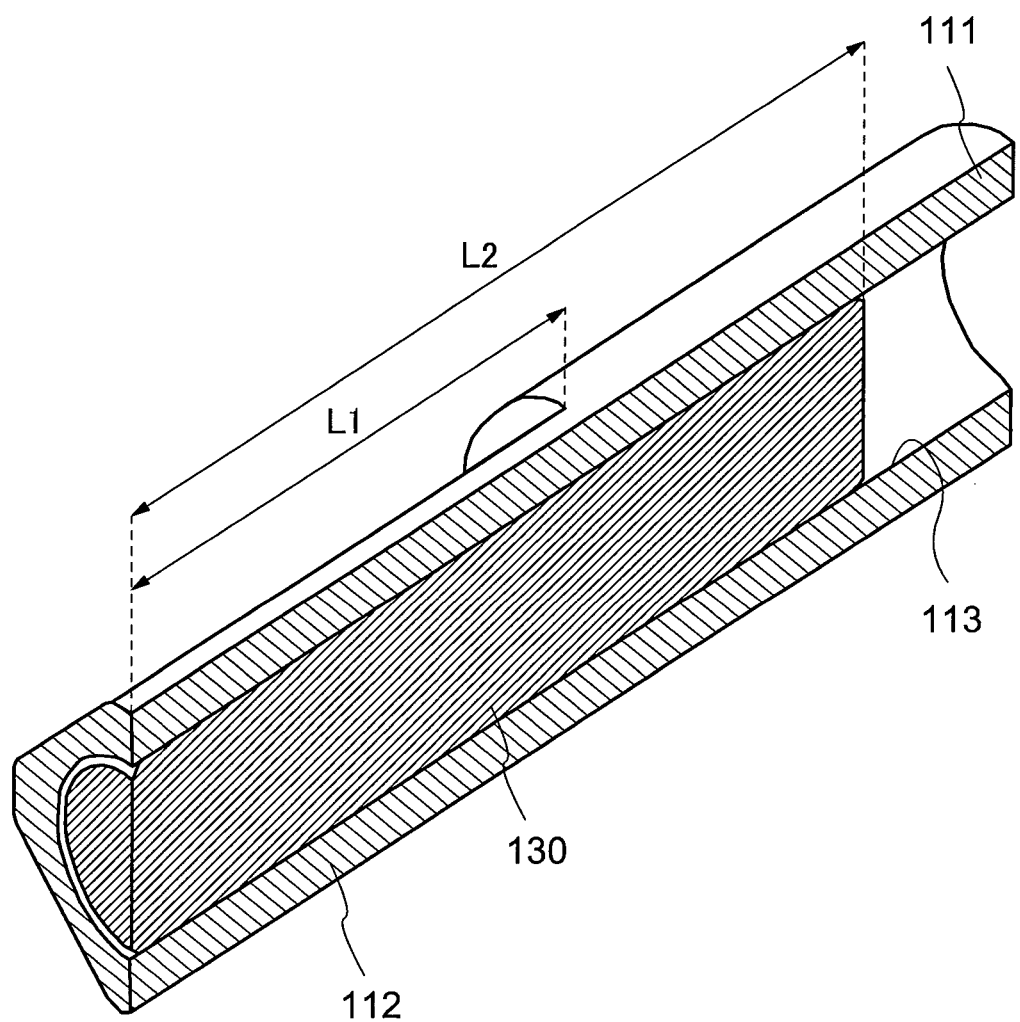
FIG. 4B is an enlarged view of an end part of a torsion bar.

FIG. 4A shows the case where a length L2 of the core rod 130 is shorter than a length L1 of the end part 112. FIG. 4B shows the case where the length L2 of the core rod 130 is longer than the length L1 of the end part 112. As illustrated, the length L2 of the core rod 130 in the first direction may be longer, shorter, or the same with respect to the length L1 of the first direction D1 of the end part 112. It may be appropriately set according to the required characteristics.

Figure 5:
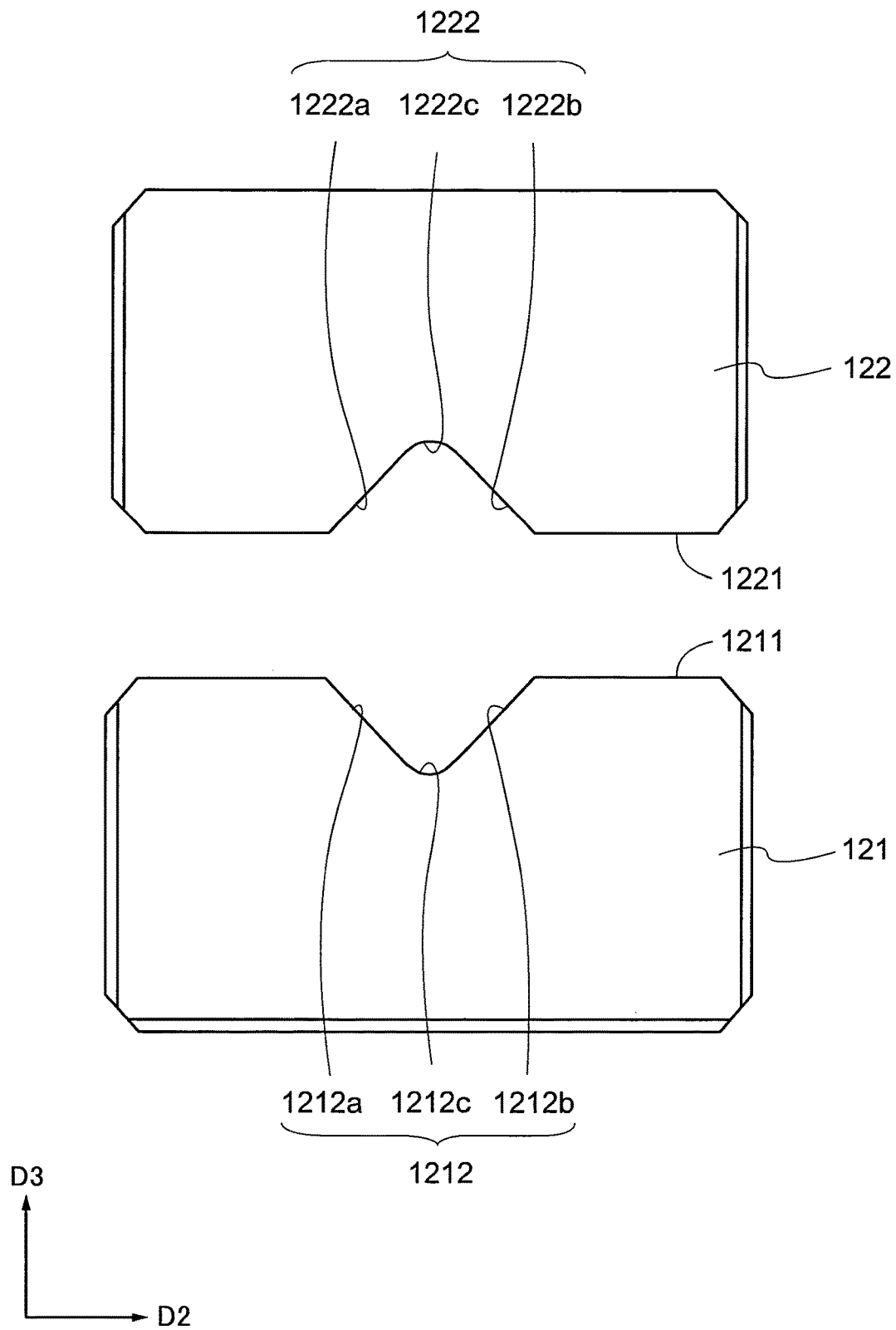
FIG. 5 is a front view of two holding members.

FIG. 5 is a front view of the holding member 121 and the holding member 122. The holding member 121 has a groove 1212 to hold the end part 112 of the torsion bar 110 from a third direction D3. The holding member 122 has a groove 1222 at a position facing the groove 1212, which holds the end part 112 of the torsion bar 110 from the third direction D3. In addition, each of the groove 1212 and the groove 1222 extends along the first direction D1. In the holding member 121, a surface on which the groove 1212 is formed is referred to as a first surface 1211. In addition, a surface of the holding member 122 on which the groove 1222 is formed is referred to as a first surface 1221. Examples of the material of the holding members 121 and 122 include but are not limited to, metals such as iron, steel, and aluminum, alloys, and hard resins.

When the holding member 121 and the holding member 122 are made to overlap, the groove 1212 and the groove 1222 face each other to form a shape corresponding to the shape of the end part 112 of the torsion bar 110. In the present embodiment, since the outer shape of the end part 112 is a quadrangular prism, the groove 1212 and the groove 1222 face each other to form a quadrangular prism. For example, in the case where the outer shape of the end part 112 is a hexagonal prism, the shape formed by the groove 1212 and the groove 1222 is a hexagonal prism. In addition, the outer shape of the end part 112 may be different from the shape formed by the groove 1212 and the groove 1222 facing each other. Even if the outer shape of the end part 112 is a hexagonal prism, the shape formed by the groove 1212 and the groove 1222 may be a diamond shape that holds only four sides of the six sides of the hexagonal prism. The end part 112 can be held such that the end part 112 of the torsion bar 110 is sandwiched by the groove 1212 of the holding member 121 and the groove 1222 of the holding member 122.

In FIG. 1, the cross-sectional shape at the end part 112 is rectangular, and the direction of one of the axes of the diagonal lines of the rectangle substantially coincides with the second direction D2. Such a configuration does not require high processing accuracy when forming the groove 1212 and the groove 1222. Although the case where the direction of one of the axes of the diagonal lines of the rectangle substantially coincides with the second direction D2 will be described in the present embodiment, an embodiment of the present invention is not limited to this. In the case where the cross-sectional shape at the end part 112 is rectangular, the groove 1212 and the groove 1222 may be formed such that the direction of one of the axes of the diagonal lines of the rectangle substantially coincides with the second direction D2.

As shown in FIG. 5, the groove 1212 has interior walls 1212a and 1212b and a ridge 1212c sandwiched between the interior wall 1212a and the interior wall 1212b. Similarly, the groove 1222 has an interior wall 1222a, an interior wall 1222b, and a ridge 1222c sandwiched between the interior wall 1222a and the interior wall 1222b. The ridges 1212c and 1222c may be rounded.

As shown in FIG. 1, the holding member 122 has a through hole 1223 in the vicinity of the groove 1222. The holding member 121 has a bolt hole (not shown in FIG. 1) in the vicinity of the groove 1212 at a position facing the through hole 1223. In FIG. 1, the through hole 1223 is arranged at four positions in the vicinity of the groove 1222. In addition, the bolt hole is arranged at four positions in the vicinity of the groove 1212. The through hole 1223 at four positions faces the bolt hole at four positions. After the end part 112 is sandwiched between the holding member 121 and the holding member 122, the bolt is inserted into the through hole 1223 and the bolt hole. As a result, the holding member 121 and the holding member 122 can be firmly fixed. The through hole arranged in the holding member 122 is not limited to four, and may be appropriately set depending on the size of the holding member 122 and the size of the groove 1222. In addition, the bolt hole arranged in the holding member 121 may be appropriately set depending on the position where the through hole is arranged.

Figure 6:
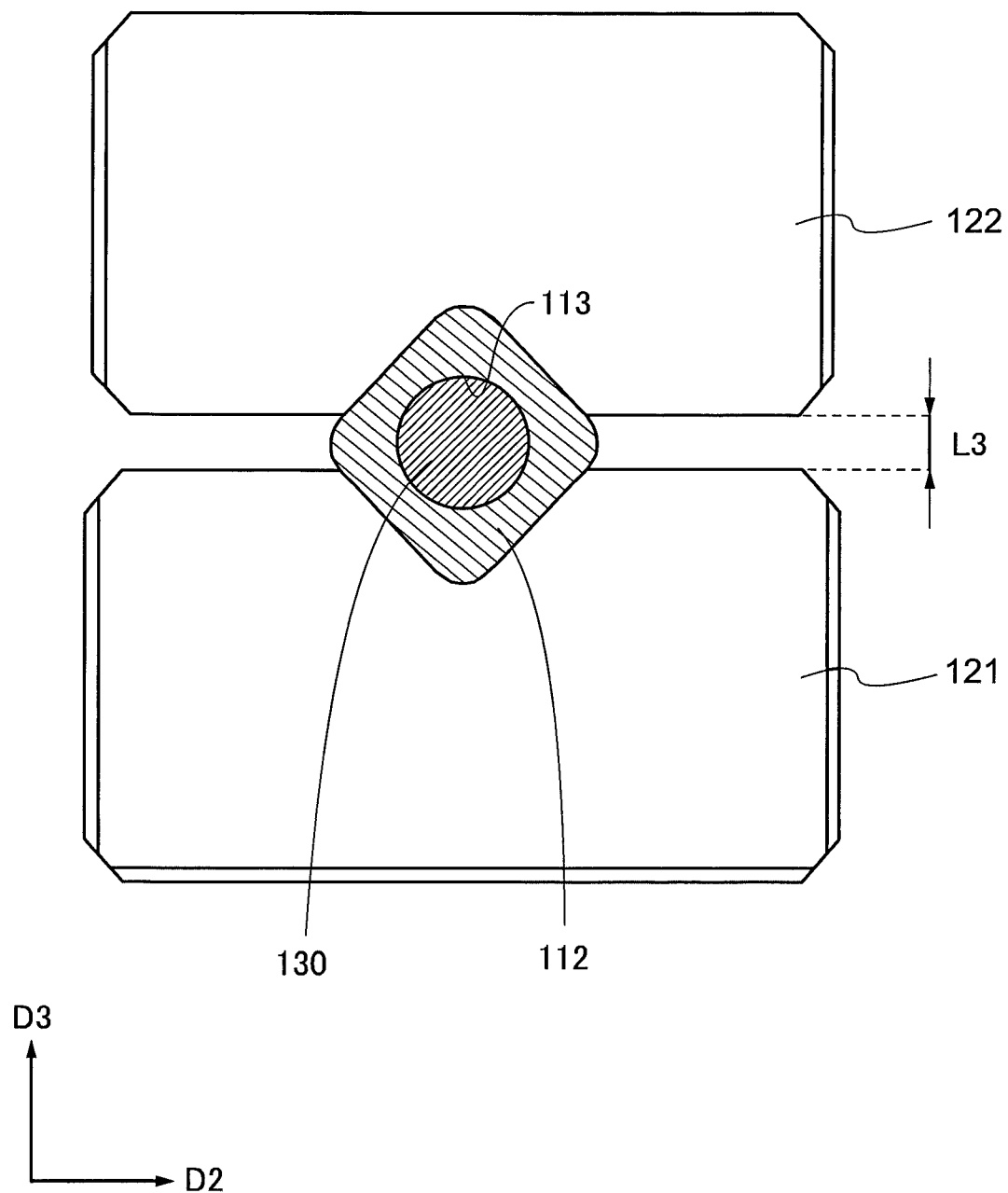
FIG. 6 is a front view of an end part of two holding members and a torsion bar.

FIG. 6 is a front view of the holding member 121 and the holding member 122 in a state sandwiching the end part 112 of the torsion bar 110. As shown in FIG. 6, a distance L3 is preferably arranged between the holding member 121 and the holding member 122. The distance L3 is also called an interference. Arranging the interference between the holding member 121 and the holding member 122 makes it possible to firmly fix the end part 112 when fixing the holding member 121 and the holding member 122 with a bolt.

Conventionally, it has been difficult to form a serration at an end part of the torsion bar using FRP due to difficulty in processing due to the presence of fibers and the fear of a decrease in strength due to the cutting of fibers. Due to variations in the material itself, it is difficult for the FRP to obtain a precise shape that can be press-fitted. Therefore, in the case where the torsion bar using the FRP is formed, a torque arm needs to be processed individually to fit the shape of the end part.

In the torsion bar unit 100 according to an embodiment of the present invention, the end part 112 of the torsion bar 110 has a cylindrical polygon shape, and is sandwiched and held by the holding member 121 and the holding member 122 on which the grooves 1212 and 1222 corresponding to the cylindrical polygonal shape of the end part 112 are formed. Since the end part 112 of the torsion bar 110 can be fixed by using the holding member 121 and the holding member 122, the end part 112 does not need to be processed after the torsion bar 110 is molded in the torsion bar 110 using the FRP. Since there is no need to individually process the torque arm according to the shape of the end part 112, the manufacturing cost can be reduced. In addition, the end part 112 of the torsion bar 110 is configured such that the holding member 121 and the holding member 122 are fixed by a bolt, so that the end part 112 of the torsion bar 110 can be securely fixed. Furthermore, the torsion bar 110 can be easily replaced.

[First Modification]

Although the case where the through hole 1223 arranged in the holding member 122 faces the bolt hole arranged in the holding member 121 has been described in the present embodiment, an embodiment of the present invention is not limited to this. The holding member 121 and the holding member 122 may be engaged by an inlay structure.

Figure 7:
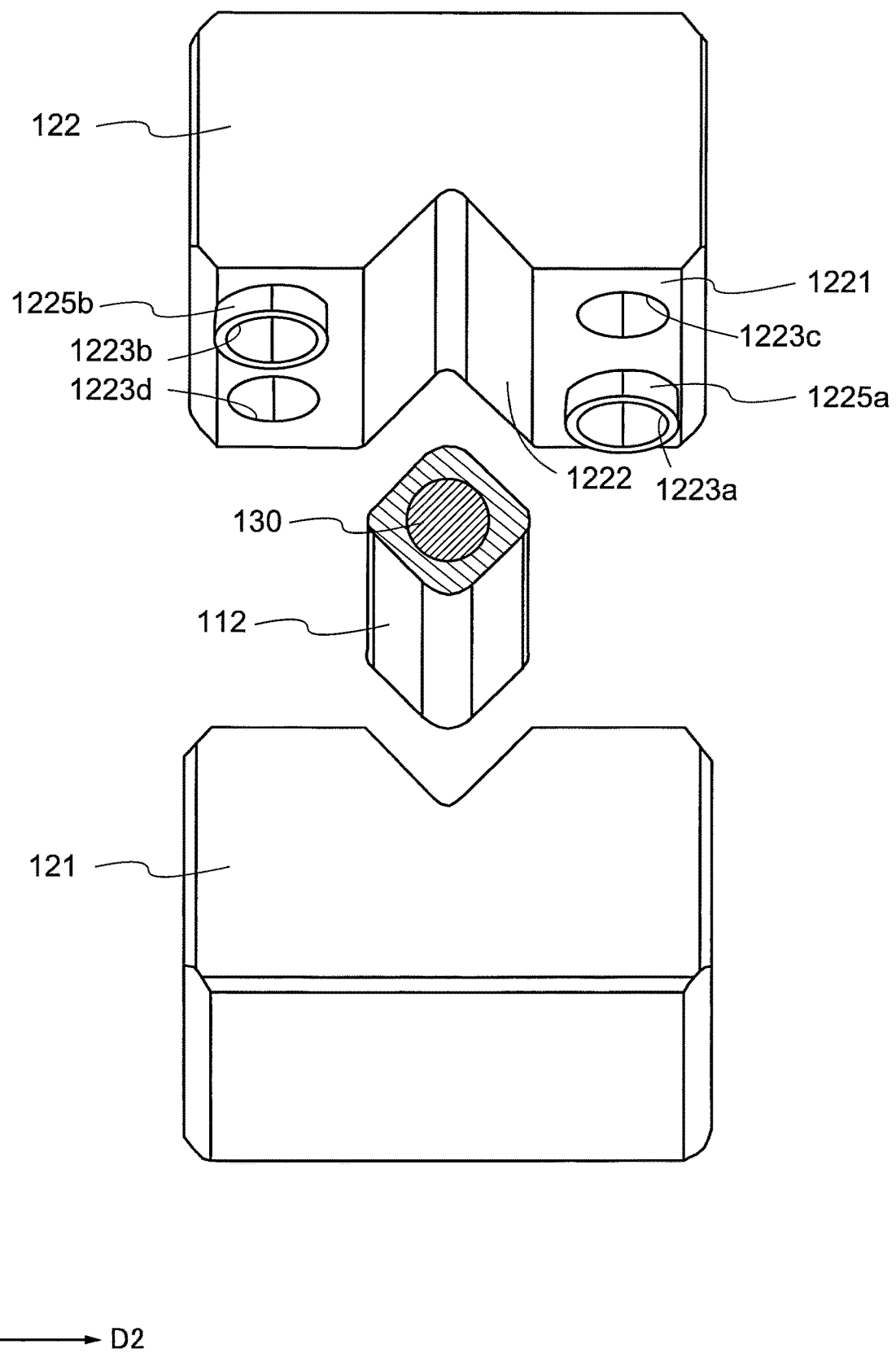
FIG. 7 is a diagram showing a first surface of a holding member.
Figure 8:
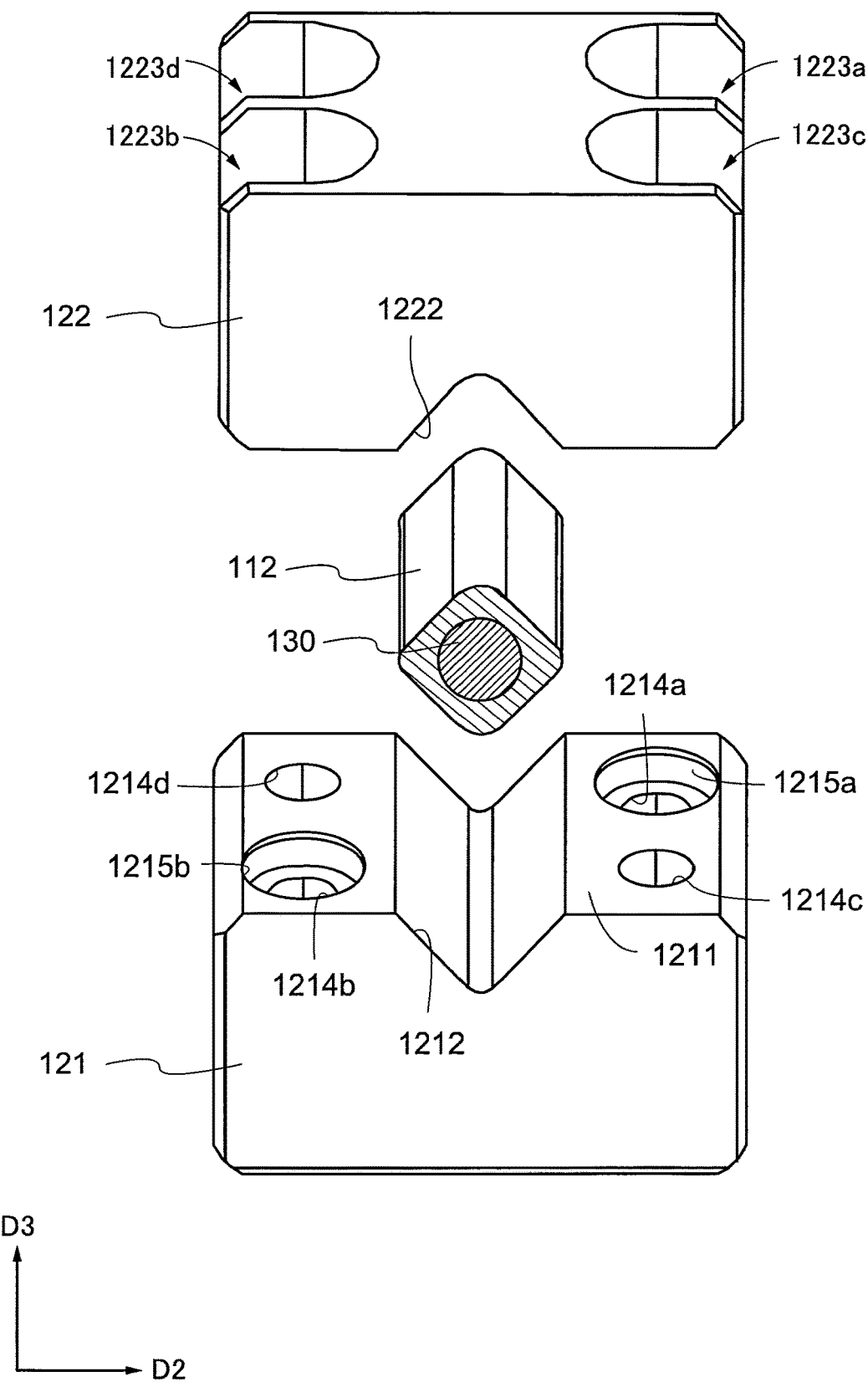
FIG. 8 is a diagram showing a first surface of a holding member.

FIG. 7 is a diagram showing the first surface 1221 of the holding member 122. FIG. 8 is a diagram showing the first surface 1211 of the holding member 121. As shown in FIG. 7, through holes 1223a to 1223d are formed at four positions in the vicinity of the groove 1222. The through holes 1223a to 1223d are aligned along the groove 1222. Inlay convex portions 1225a and 1225b projecting from the first surface 1221 are arranged at a peripheral portion of the through holes 1223a and 1223b. In other words, the through holes 1223a and 1223b are arranged so as to penetrate the inlay convex portions 1225a and 1225b.

As shown in FIG. 8, bolt holes 1214a to 1214d corresponding to the through holes 1223a to 1223d are formed at four positions in the vicinity of the groove 1212. The bolt holes 1214a to 1214d are aligned along the groove 1212. Inlay recess portions 1215a and 1215b that engage with the inlay convex portions 1225a and 1225b are arranged at a peripheral portion of the bolt holes 1214a and 1214b. In other words, the bolt holes 1214a and 1214b are arranged on bottom surfaces of the inlay recess portions 1215a and 1215b. When the holding member 121 and the holding member 122 face each other, the inlay convex portions 1225a and 1225b projecting from the first surface 1221 are fitted into the inlay recess portions 1215a and 1215b arranged on the first surface 1211. This makes it possible to easily position the holding member 121 and the holding member 122. In this state, the bolt is inserted into each of the through hole 1223a to the through hole 1223d to fix them. As a result, the holding member 121 and the holding member 122 can be firmly fixed.

In FIG. 7, the inlay convex portions 1225a and 1225b are arranged so as not to be adjacent to each other in both the first direction D1 and the second direction D2. In FIG. 8, the inlay recess portions 1215a and 1215b are arranged so as not to be adjacent to each other in both the first direction D1 and the second direction D2. This improves the positioning accuracy between the holding member 121 and the holding member 122. In addition, the rigidity against relative misalignment between the holding member 121 and the holding member 122 is improved.

Although the case where the inlay convex portions 1225a and 1225b are arranged so as not to be adjacent to each other in both the first direction D1 and the second direction D2 has been described in FIG. 7, an embodiment of the present invention is not limited to this. The inlay convex portions may be arranged in all of the through holes. In addition, a plurality of inlay convex portions may be adjacent to each other in the first direction D1 or the second direction D2.

Although the case where the inlay recess portions 1215a and 1215b are arranged so as not to be adjacent to each other in both the first direction D1 and the second direction D2 has been described in FIG. 8, an embodiment of the present invention is not limited to this. If the inlay convex portion is arranged in all of the through holes of the holding member 122, the inlay recess portion may also be arranged in all of the bolt holes. As described above, the number of inlay convex portions and inlay recess portions may be appropriately set depending on the size of the holding member 121 and the size of the groove 1212.

Although the case where the inlay convex portions 1225a and 1225b are arranged in the holding member 122 is shown in FIG. 7 and the case where the inlay recess portions 1215a and 1215b are arranged in the holding member 121 is shown in FIG. 8, an embodiment of the present invention is not limited to this. The inlay convex portions may be arranged in the holding member 121 instead of the inlay recess portions 1215a and 1215b, and the inlay recess portions may be arranged in the holding member 122 instead of the inlay convex portions 1225a and 1225b. In this case, the holding member 122 may have, in the vicinity of the groove 1222, an inlay recess portion arranged on a surface facing the holding member 121 and the through hole 1223 penetrating the inlay recess portion, and the holding member 121 may have a bolt hole arranged at a position corresponding to the through hole 1223 in the inlay convex portion engaged with the inlay recess portion.

[Second Modification]

Figure 9:
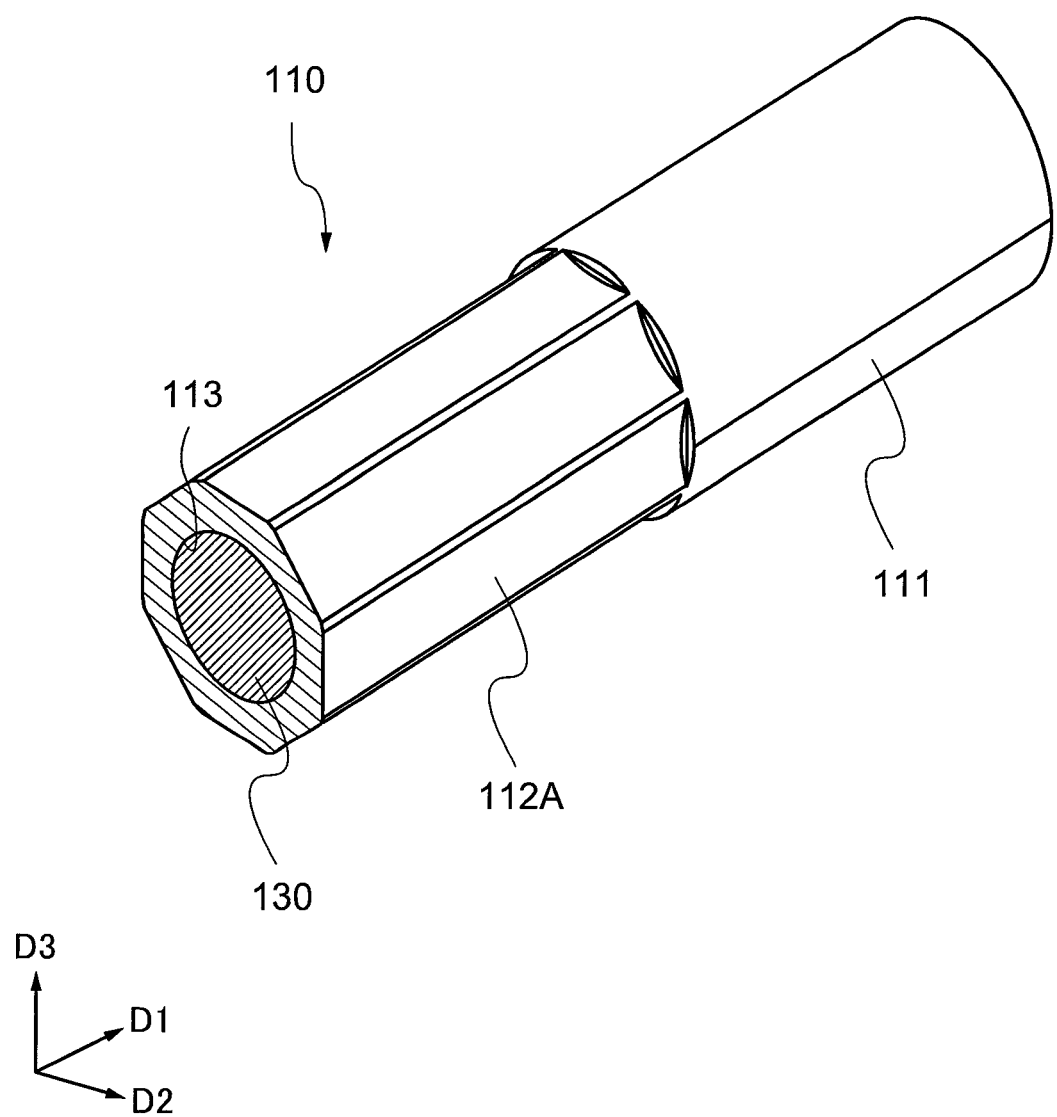
FIG. 9 is an enlarged view of an end part of a torsion bar.

Although the case where the shape of the end part 112 of the torsion bar 110 is the cylindrical quadrangular shape has been described in the present embodiment, an embodiment of the present invention is not limited to this. For example, as shown in FIG. 9, the shape of the end part 112 may be a cylindrical octagon shape.

In the case where the shape of the end part 112 is a cylindrical octagon shape, the shape formed by the groove 1212 and the groove 1222 facing each other is an octagonal prism. In addition, even if the outer shape of the end part 112 is an octagonal prism, the shape formed by the groove 1212 and the groove 1222 may be a diamond shape that holds only four sides of the eight sides of the octagonal prism. Furthermore, if the cross-sectional shape of the end part 112 is octagonal, the direction of one of the axes of the diagonal lines of the octagon substantially coincides with the second direction D2. Such a configuration is preferable in forming the groove 1212 and the groove 1222 because high accuracy processing is not required. In addition, since the cylindrical octagon shape is closer to the cylindrical shape than the cylindrical quadrangular shape and the cylindrical hexagon shape, the stress caused by the torsion is equalized.

Although the case where the direction of one of the axes of the diagonal lines of the polygon substantially coincides with the second direction D2 has been described in the present embodiment, the present embodiment is not limited to this. The groove 1212 and the groove 1222 may be formed such that one of the axes of the diagonal lines of the polygon coincides with the second direction D2.

[Third Modification]

Although the case where the thickness of the end part 112 of the torsion bar 110 is smaller than the thickness of the body 111 has been described in the present embodiment, an embodiment of the present invention is not limited to this. The thickness of the end part 112 may be greater than the thickness of the body 111.

Figure 10:
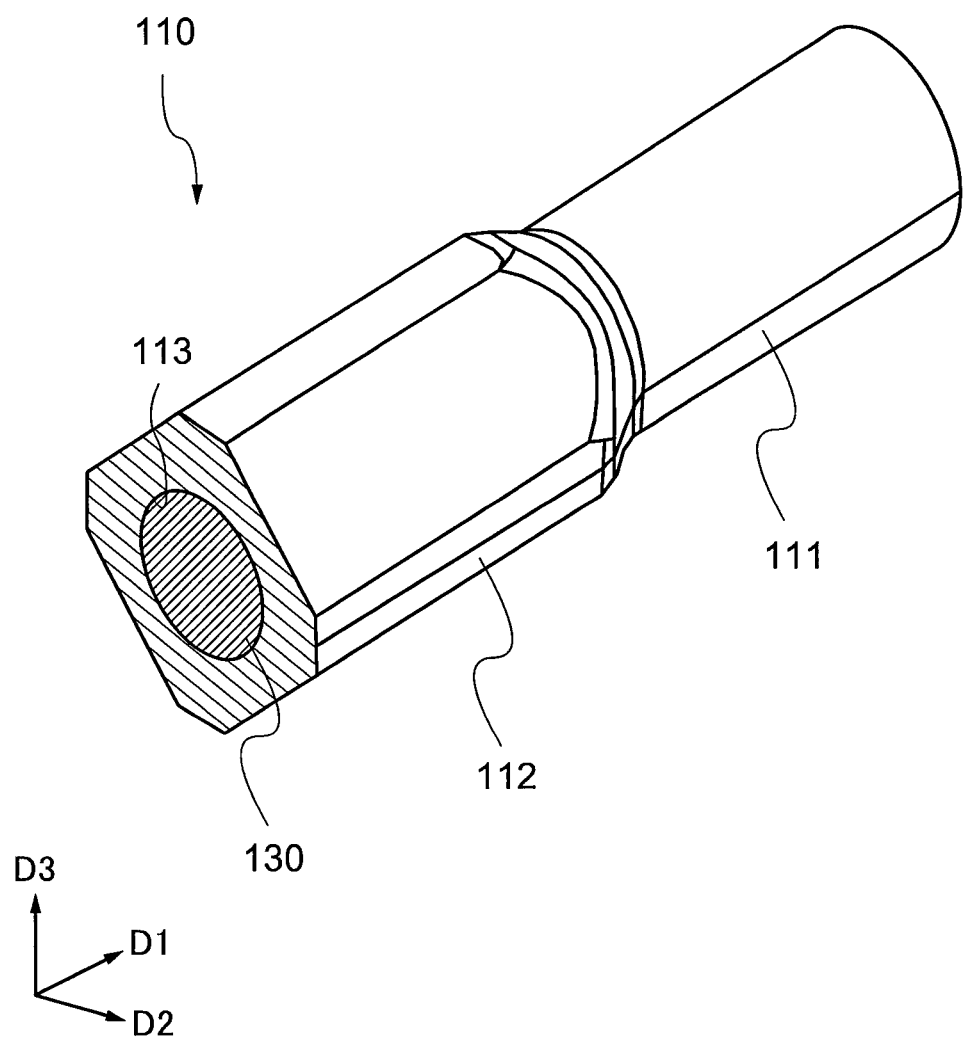
FIG. 10 is an enlarged view of an end part of a torsion bar.

FIG. 10 is an enlarged view of the end part 112 of the torsion bar 110. For example, the diameter of the inscribed circle of the cross-sectional shape at the end part 112 may be greater than the diameter of the cross-sectional shape of the body 111 of the torsion bar 110. In this case, when the end part 112 is sandwiched and held by the holding member 121 and the holding member 122, the compressive strength of the end part 112 can be improved. In addition, in the case where the diameter of the inscribed circle of the cross-sectional shape at the end part 112 is larger than the diameter of the cross-sectional shape of the body 111 of the torsion bar 110, a stress-free shape may be formed at a boundary between the body 111 and the end part 112. For example, it may be a shape in that the diameter of the inscribed circle of the cross-sectional shape contiguously changes at the boundary between the end part 112 and the body 111. When forming the torsion bar 110, the thickness of the end part 112 can be made thicker than the thickness of the body 111 by winding the sheet-like or filamentary material at the end part 112 more than the body 111.

Although the case where the shape of the end part 112 is a cylindrical quadrangular shape has been described in FIG. 10, it is the same as the case of the cylindrical quadrangular shape even if the shape of the end part 112 is another cylindrical polygon shape.

[Fourth Modification]

Although the method of fixing the holding member 121 and the holding member 122 by the bolt has been described in the present embodiment, an embodiment of the present invention is not limited to this. The holding member 121 and the holding member 122 may be fixed by an adhesive. In this case, the distance (interference) is not arranged between the holding member 121 and the holding member 122 in the state where the holding member 121 and the holding member 122 sandwich the end part 112 of the torsion bar 110.

Figure 11A:
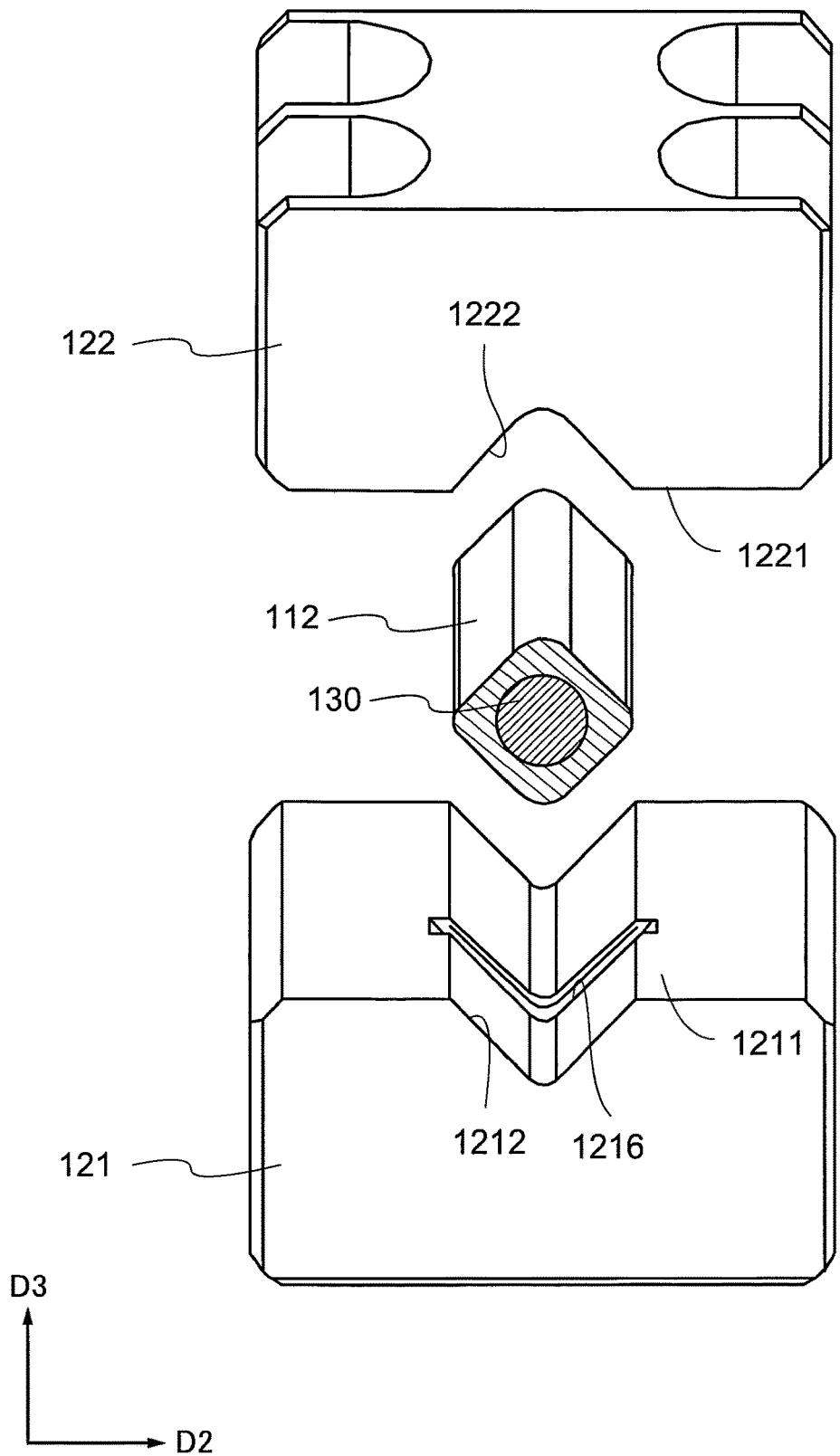
FIG. 11A is a diagram showing a first surface of a holding member.

FIG. 11A is a diagram showing the first surface 1211 of the holding member 121. As shown in 11A, a groove 1216 is arranged at the groove 1212 of the holding member 121. The groove 1216 extends along a direction intersecting the direction in which the groove 1212 extends. Although not shown, the holding member 122 also has a groove extending in a direction intersecting the direction in which the groove 1222 extends. The groove arranged in the holding member 122 may face the groove 1216.

In the case where the holding member 121 and the holding member 122 are fixed with an adhesive, the adhesive is applied to the first surface 1211 and the groove 1212 of the holding member 121, and the first surface 1221 and the groove 1222 of the holding member 122. After that, the first surface 1211 and the first surface 1221 are bonded with the end part 112 interposed therebetween, and the groove 1212, the groove 1222, and the end part 112 are bonded. In this case, the adhesive enters the groove 1216 and the groove arranged in the holding member 122. As a result, it is possible to suppress the adhesive from protruding.

Figure 11B:
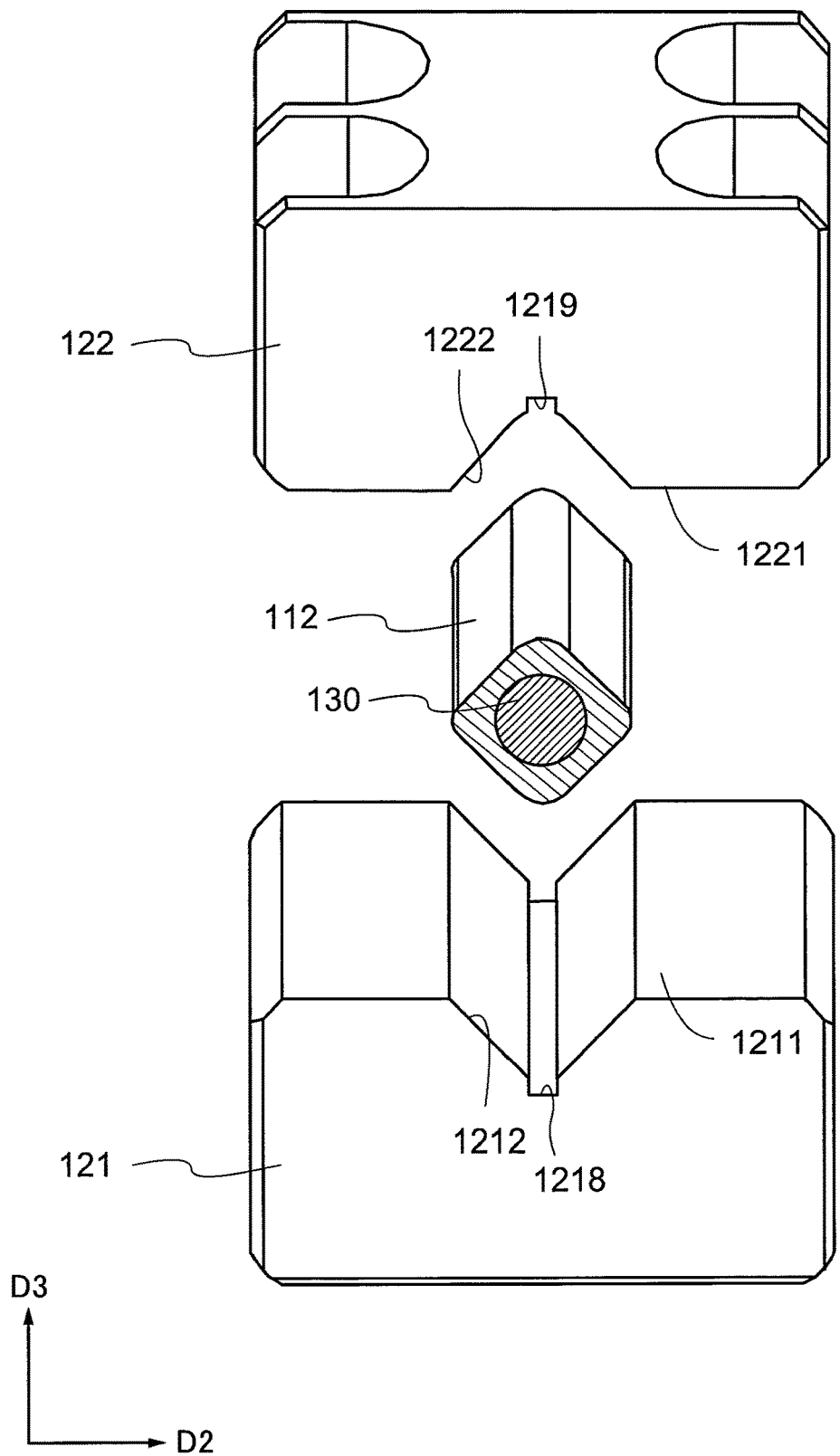
FIG. 11B is a diagram showing a first surface of a holding member.

FIG. 11B is a diagram showing the first surface 1211 of the holding member 121. As shown in FIG. 11B, a groove 1218 extends along a direction parallel to the direction in which the groove 1212 extends. A groove 1219 extends along a direction parallel to the direction in which the groove 1222 extends. A position where the groove 1218 is arranged corresponds to the ridge 1212c shown in FIG. 5. A position where the groove 1219 is arranged corresponds to the ridge 1222c shown in FIG. 5. The grooves 1218 and 1219 can suppress the adhesive from protruding.

Even when the holding member 121 and the holding member 122 are fixed by a bolt, the end part 112 may be fixed by an adhesive. As shown in FIG. 7 and FIG. 8, even when the holding member 121 and the holding member 122 constitute the inlay structure, the holding member 121 and the holding member 122 may be bonded to each other by an adhesive. For example, in the holding member 121 shown in FIG. 8, a groove extending in a direction intersecting the direction in which the groove 1212 extends may be arranged, or a groove extending in a direction parallel to the direction in which the groove 1212 extends may be arranged. In the holding member 122 shown in FIG. 7, a groove extending in a direction intersecting the direction in which the groove 1222 extends may be arranged, or a groove extending in a direction parallel to the direction in which the groove 1222 extends may be arranged. The holding member 121 and the holding member 122 are fixed by a bolt, and the holding member 121 and the holding member 122 are firmly fixed using an adhesive.

Although the case where the groove 1216 intersecting the groove 1212 is arranged at one location is shown in FIG. 11A and FIG. 11B, it may be arranged at a plurality of places. Similarly, the groove intersecting the groove 1222 arranged in the holding member 122 may be arranged at a plurality of locations.

In addition, the end part 112 of the torsion bar 110 may be fixed by fixing the holding member 121 and the holding member 122 by welding. In this case, there may be a distance (interference) between the holding member 121 and the holding member 122 in a state sandwiching the end part 112 of the torsion bar 110 by the holding member 121 and the holding member 122. It is preferable to perform welding while applying a load in a state where the end part 112 is sandwiched between the holding member 121 and the holding member 122. In addition, the through hole arranged in the holding member 121 and the bolt hole arranged in the holding member 122 can be omitted. The holding member 121 and the holding member 122 are fixed by welding, so that the end part 112 can be firmly fixed by the holding member 121 and the holding member 122.

[Fifth Modification]

Although the case where the torsion bar unit 100 is attached to the torque arm has been described in the present embodiment, an embodiment of the present invention is not limited to this. For example, one of the holding members 121 and 122 may be integrally formed with a vehicle body, an arm, or the like. In addition, it may be integrally formed with a suspension arm, an anchor arm, a torque arm, or the like.

Figure 12:
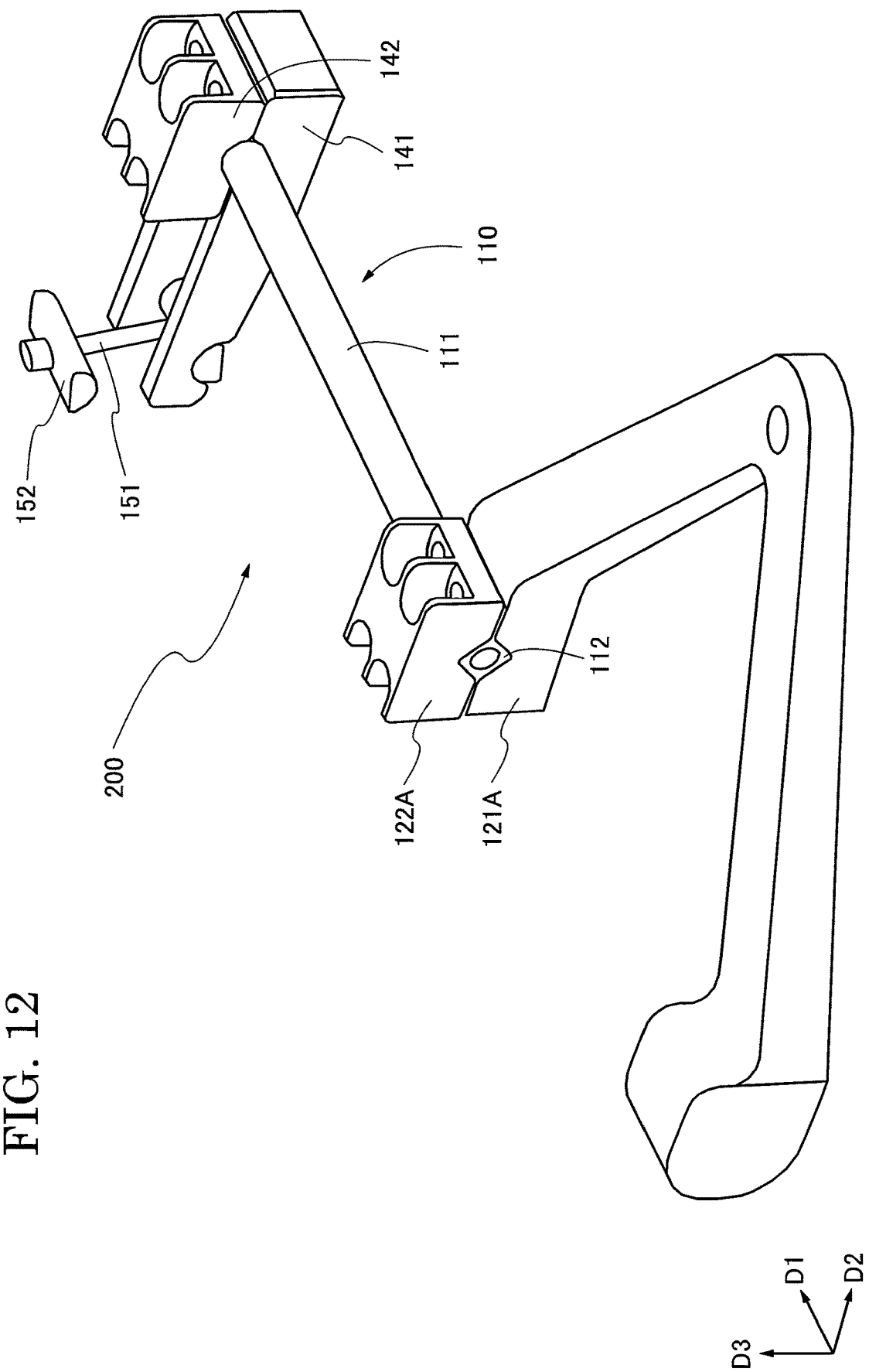
FIG. 12 is a schematic diagram of a torsion bar unit integrally formed with a torque arm.

FIG. 12 is a schematic diagram of a torsion bar unit 200. As shown in FIG. 12, one end part 112 of the torsion bar 110 is sandwiched and held by a holding member 121A and a holding member 122A. The holding member 121A functions as a suspension arm. The holding member 122A is fixed to the holding member 121A by a bolt (not shown). For an explanation of a mechanism for sandwiching and holding the end part 112 by the holding member 121A and the holding member 122A, refer to the description of the holding member 121 and the holding member 122 in FIG. 1 to FIG. 11B.

The other end part 112 of the torsion bar 110 is sandwiched and held by a holding member 141 and a holding member 142. The holding member 141 and the holding member 142 are arranged on the vehicle body side. The holding member 142 is fixed to the holding member 141 by a bolt (not shown). For an explanation of a mechanism for sandwiching and holding the end part 112 by the holding member 141 and the holding member 142, refer to the description of the holding member 121 and the holding member 122 in FIG. 1 to FIG. 11B. The holding member 141 is connected to a vehicle height adjustment bolt 151. The vehicle height adjustment bolt 151 is connected to the vehicle body by a fixing portion 152. As shown in FIG. 12, at least one of the holding members 121 and 122 and at least one of the holding members 141 and 142 are integrally formed with other components, thereby reducing the number of components.

The torsion bar units 100 and 200 described above as an embodiment of the present invention can be appropriately combined and implemented as long as no contradiction is caused. Furthermore, the addition, deletion, or design change of components as appropriate by those skilled in the art based on each embodiment of the present embodiment are also included in the scope of the present invention as long as they are provided with the gist of the present invention.

Furthermore, it is understood that, even if the effect is different from those provided by each of the above-described embodiments, the effect obvious from the description in the specification or easily predicted by persons ordinarily skilled in the art is apparently derived from the present invention.

What is claimed is:

1. A torsion bar unit comprising:
    a cylindrical shaped torsion bar comprising a fiber-reinforced composite material and extending in a first direction,
    a first holding member having a first groove for holding an end part of the torsion bar,
    a second holding member having a second groove for holding the end part of the torsion bar at a position opposite the first groove and sandwiching and holding the end part of the torsion bar between the first groove and the second groove by overlapping the first holding member and the second holding member, and
    a first core rod inserted into a hollow portion with a cylindrical shape at the end part,
    wherein a cross-sectional shape of an outer shape of the end part is polygonal,
    a cross-sectional shape of the hollow portion of the end part is circular, and
    a cross-sectional shape of the first core rod is circular.
2. The torsion bar unit according to claim 1, wherein a corner of a tip of the first core rod is rounded or tapered in a direction of insertion of the first core rod into the cylindrical shaped hollow portion.
3. The torsion bar unit according to claim 1, wherein the cross-sectional shape of the outer shape of the end part is a square, hexagonal, or octagon shape.
4. The torsion bar unit according to claim 1, wherein the second holding member has a through hole in a vicinity of the second groove,
    the first holding member has a bolt hole in a position opposite the through hole, and
    the first holding member is secured to the second holding member by a bolt inserted into the through hole of the second holding member.
5. The torsion bar unit according to claim 1, wherein the second holding member has an inlay convex portion projecting from a surface opposite the first holding member in a vicinity of the second groove and a through hole passing through the inlay convex portion, and
    the first holding member has an inlay recess portion engaging with the inlay convex portion and a bolt hole formed on a bottom surface of the inlay recess portion and located at a position corresponding to the through hole.
6. The torsion bar unit according to claim 1, wherein the second holding member has an inlay recess portion provided on a surface opposite the first holding member in a vicinity of the second groove and a through hole passing through the inlay recess portion, and
    the first holding member has an inlay convex portion engaging with the inlay convex portion and a bolt hole provided in the inlay convex portion at a position corresponding to the through hole.
7. The torsion bar unit according to claim 1, wherein the first holding member is fixed to the second holding member by an adhesive material.
8. The torsion bar unit according to claim 7, wherein the first groove extends along the first direction,
    a third groove is provided in the first groove,
    the second groove extends along the first direction, and
    a fourth groove is provided in the second groove.
9. The torsion bar unit according to claim 1, wherein the first and second holding members are fixed by welding.
10. The torsion bar unit according to claim 1, wherein a thickness of the end part is thicker than a thickness of a portion of the torsion bar other than the end part.
11. The torsion bar unit according to claim 1, wherein the first holding member is integrally formed with a suspension arm, anchor arm, or torque arm.
12. The torsion bar unit according to claim 1, wherein a diameter of the first core rod is the same as a diameter of the hollow portion at the end of the torsion bar.
13. The torsion bar unit according to claim 1, wherein a length of the first core rod in the first direction is longer than a length of the end part held by the first holding member and the second holding member in the first direction.
14. The torsion bar unit according to claim 1, wherein a length of the first core rod in the first direction is less than or equal to a length held by the first holding member and the second holding member in the first direction.
15. The torsion bar unit according to claim 1, wherein no first core rod is inserted into the hollow portion of a region other than a region held by the first holding member and the second holding member, in the torsion bar.
16. The torsion bar unit according to claim 1, further comprising:
    a third holding member having a third groove for holding the other end part of the torsion bar,
    a fourth holding member having a fourth groove for holding the other end part of the torsion bar at a position opposite the third groove and sandwiching and holding the other end part of the torsion bar between the third groove and the fourth groove by overlapping the third holding member and the fourth holding member, and
    a second core rod inserted into a hollow portion of the cylindrical shape at the other end part,
    wherein a cross-sectional shape of an outer shape of the other end part is polygonal,
    a cross-sectional shape of the hollow portion of the other end part is circular, and
    a cross-sectional shape of the second core rod is circular.

* * * * *